US009689574B2

(12) United States Patent
Crothers et al.

(10) Patent No.: US 9,689,574 B2
(45) Date of Patent: Jun. 27, 2017

(54) SYSTEM AND METHOD FOR REDUCING MODAL COUPLING OF COMBUSTION DYNAMICS

(71) Applicant: General Electric Company, Schenectady, NY (US)

(72) Inventors: Sarah Lori Crothers, Greenville, SC (US); Christian Xavier Stevenson, Blanchester, OH (US); Alberto Jose Negroni, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 547 days.

(21) Appl. No.: 14/170,738

(22) Filed: Feb. 3, 2014

(65) Prior Publication Data

US 2015/0219337 A1    Aug. 6, 2015

(51) Int. Cl.
  *F23R 3/42*      (2006.01)
  *F23R 3/34*      (2006.01)
  *F23R 3/28*      (2006.01)
  *F23R 3/46*      (2006.01)
  *F02C 9/34*      (2006.01)

(52) U.S. Cl.
  CPC .............. *F23R 3/34* (2013.01); *F02C 9/34* (2013.01); *F23R 3/286* (2013.01); *F23R 3/46* (2013.01); *F05D 2260/964* (2013.01); *F23R 2900/00014* (2013.01)

(58) Field of Classification Search
  CPC ..... F23R 3/34; F23R 3/286; F23R 3/46; F23R 2900/00014; F02C 9/34; F05D 2260/964
  See application file for complete search history.

(56) References Cited

U.S. PATENT DOCUMENTS

| | | | |
|---|---|---|---|
| 5,943,866 A | 8/1999 | Lovett et al. | |
| 6,164,055 A | 12/2000 | Lovett et al. | |
| 7,451,601 B2 | 11/2008 | Taware et al. | |
| 7,578,130 B1 | 8/2009 | Kraemer et al. | |
| 7,739,999 B2 | 6/2010 | Kang et al. | |
| 8,112,216 B2 | 2/2012 | Davis, Jr. et al. | |
| 8,322,140 B2 | 12/2012 | Kim et al. | |
| 9,291,098 B2 * | 3/2016 | Chen | F02C 3/22 |
| 9,291,103 B2 * | 3/2016 | Belsom | F23R 3/286 |
| 2010/0192578 A1 | 8/2010 | Singh et al. | |
| 2011/0072826 A1 | 3/2011 | Narra et al. | |
| 2012/0006029 A1 | 1/2012 | Bilbao et al. | |

* cited by examiner

*Primary Examiner* — Richard Chang
(74) *Attorney, Agent, or Firm* — Charlotte C. Wilson; Ernest G. Cusick; Frank A. Landgraff

(57) ABSTRACT

A system and method for reducing modal coupling of combustion dynamics generally include multiple combustors, and each combustor includes multiple fuel nozzle groups for mixing fuel with a compressed working fluid prior to combustion. A fuel circuit is in fluid communication with each fuel nozzle, and orifice plates in the fuel circuit upstream from the fuel nozzles control the fuel split between the fuel nozzles in each combustor and/or between different combustors to produce a frequency difference between combustors.

16 Claims, 4 Drawing Sheets

SYSTEM AND METHOD FOR REDUCING MODAL COUPLING OF COMBUSTION DYNAMICS

TECHNICAL FIELD

The present invention generally involves a system and method for reducing modal coupling of combustion dynamics. In particular embodiments, the system and method may be incorporated into a gas turbine or other turbomachine.

BACKGROUND

Combustors are commonly used in industrial and commercial operations to ignite fuel to produce combustion gases having a high temperature and pressure. For example, gas turbines and other turbomachines typically include one or more combustors to generate power or thrust. A typical gas turbine used to generate electrical power includes an axial compressor at the front, multiple combustors around the middle, and a turbine at the rear. Ambient air enters the compressor as a working fluid, and the compressor progressively imparts kinetic energy to the working fluid to produce a compressed working fluid at a highly energized state. The compressed working fluid exits the compressor and flows through one or more fuel nozzles in the combustors where the compressed working fluid mixes with fuel before igniting to generate combustion gases having a high temperature and pressure. The combustion gases flow to the turbine where they expand to produce work. For example, expansion of the combustion gases in the turbine may rotate a shaft connected to a generator to produce electricity.

At particular operating conditions, combustion dynamics at specific frequencies and with sufficient amplitudes, which are in-phase and coherent, may produce undesirable sympathetic vibrations in the turbine and/or other downstream components. Typically, this problem is managed by combustor tuning. It has been found that conventional combustor tuning to protect the turbine buckets, however, may impose undesirable and unnecessary restrictions on the function and operability of the combustor.

Altering the frequency relationship between two or more combustors may reduce the coherence of the combustion system as a whole, diminishing any combustor-to-combustor coupling. In the context of this invention, coherence refers to the strength of the linear relationship between two (or more) dynamic signals, which is strongly influenced by the degree of frequency overlap between them. As the combustion dynamics frequency in one or more combustors is driven away from that of the other combustors, modal coupling of combustion dynamics is reduced, which, in turn, reduces the ability of the combustor tone to cause a vibratory response in downstream components.

Therefore, a system and method that reduces the modal coupling of combustion dynamics by varying the combustion instability frequency between two or more combustors would be useful for enhancing the thermodynamic efficiency of the combustors, protecting against accelerated wear, promoting flame stability, and/or reducing undesirable emissions over a wide range of operating levels, without detrimentally impacting the life of the downstream hot gas path components.

SUMMARY

Aspects and advantages of the invention are set forth below in the following description, or may be obvious from the description, or may be learned through practice of the invention.

One embodiment of the present invention is a system for reducing modal coupling of combustion dynamics. The system includes a plurality of combustors, wherein each combustor has at least a primary fuel nozzle group and a secondary fuel nozzle group and wherein each combustor operates at a combustion frequency. A primary fuel circuit includes a primary fuel manifold and a plurality of fuel supply lines extending from the primary fuel manifold, one of the fuel supply lines being in fluid communication with the primary fuel nozzle group of a first combustor and another of the fuel supply lines being in fluid communication with the primary fuel nozzle group of a second combustor. A first orifice plate is disposed in the first fuel supply line upstream from the primary fuel nozzle group and defines a first effective area, and a second orifice plate is disposed in the second fuel supply line upstream from the primary fuel nozzle group of the second combustor and defines a second effective area substantially different from the first effective area. The differences in the first and second effective areas results in a difference in the combustion frequencies of the first combustor and the second combustor.

In another embodiment of the present invention, a gas turbine includes a compressor section configured to produce a compressed working fluid; a plurality of combustors downstream from the compressor section; and a turbine section downstream from the plurality of combustors. Each combustor has a primary fuel nozzle group and a secondary fuel nozzle group, and each combustor operates at a combustion frequency. A primary fuel circuit includes a primary fuel manifold and a plurality of fuel supply lines extending from the primary fuel manifold, a first fuel supply line being in fluid communication with the primary fuel nozzle group of a first combustor and a second fuel supply line being in fluid communication with the primary fuel nozzle group of a second combustor. A first primary orifice plate is disposed in the first fuel supply line upstream from the primary fuel nozzle group of the first combustor and defines a first effective area. A second primary orifice plate is disposed in the second fuel supply line upstream from the primary fuel nozzle group of the second combustor and defines a second effective area substantially different from the first effective area. The differences in the first and second effective areas results in a difference in the combustion frequencies of the first combustor and the second combustor.

The present invention may also include a method for reducing modal coupling of combustion dynamics. The method includes flowing fuel through a first primary orifice plate to a primary fuel nozzle group in a first combustor at a first flow rate and flowing fuel through a first secondary orifice plate to a secondary fuel nozzle group in the first combustor at a second flow rate. The method further includes flowing fuel through a second primary orifice plate to a primary fuel nozzle group in a second combustor at a third flow rate and flowing fuel through a second secondary orifice plate to a secondary fuel nozzle group in the second combustor at a fourth flow rate. At least two of the first, second, third, and fourth flow rates are substantially different from each other.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION

Figure 1:
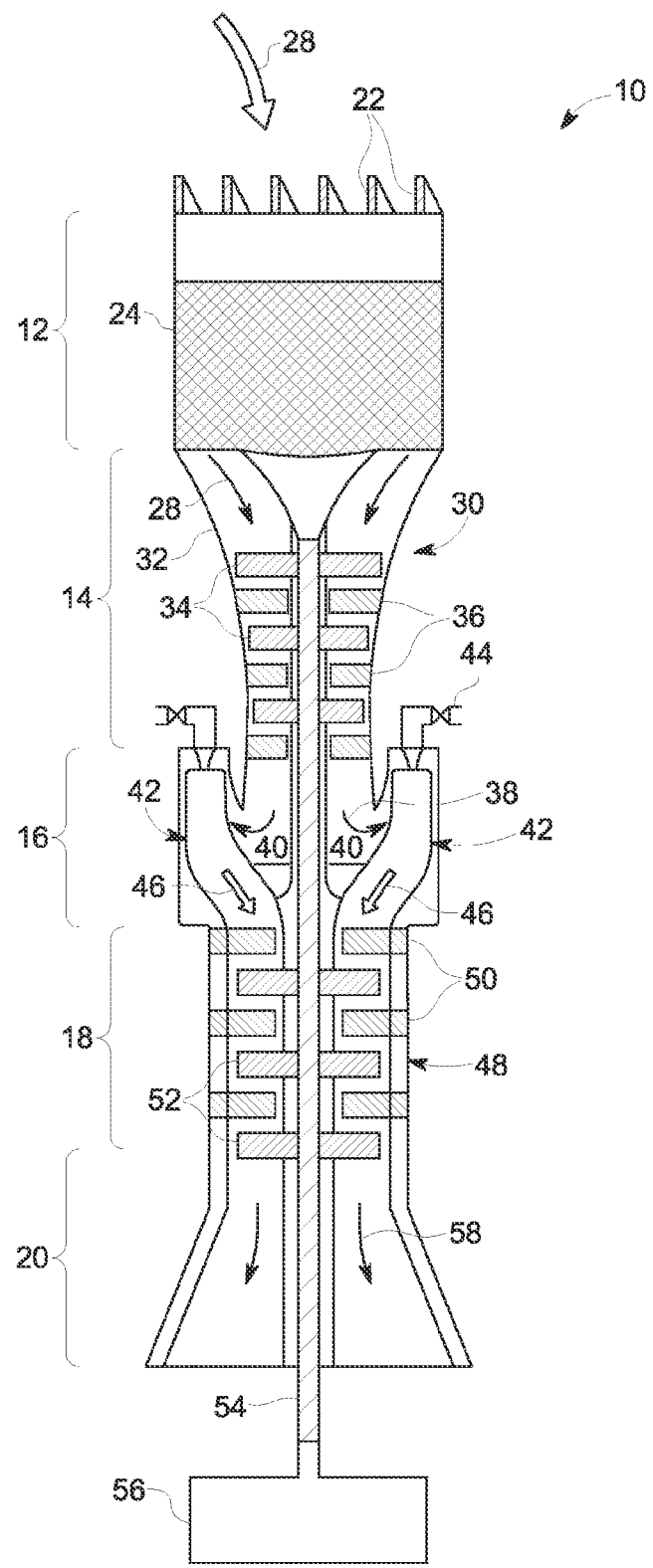
FIG. 1 is a simplified cross-section view of an exemplary gas turbine, according to various embodiments of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components. Similarly, the terms "primary," "secondary", and "tertiary" may be used to distinguish one component from another and are not intended to signify location or importance of the individual components. The terms "upstream," "downstream," "radially," and "axially" refer to the relative direction with respect to fluid flow in a fluid pathway. For example, "upstream" refers to the direction from which the fluid flows (i.e., through the fuel nozzles), and "downstream" refers to the direction to which the fluid flows (i.e., toward the turbine section). The term "radially" refers to the relative direction substantially perpendicular to the fluid flow, and the term "axially" refers to the relative direction substantially parallel to the fluid flow.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Various embodiments of the present invention include a system and method for reducing modal coupling of combustion dynamics. The system and method generally include multiple combustors, and each combustor includes multiple fuel nozzles for introducing (e.g., mixing) fuel with a compressed working fluid (e.g., air) prior to combustion.

Within each combustor, the fuel nozzles may be arranged in groups of one or more fuel nozzles, which will be referred to herein as a "primary fuel nozzle group", a "secondary fuel nozzle group," and a "tertiary fuel nozzle group." These designations are provided wholly to facilitate a discussion of the relative groups and in no way should be interpreted as imparting greater (or lesser) importance to any particular group. In the exemplary configurations shown in FIGS. 3-5, one group (e.g., a primary fuel nozzle group) may include only the center fuel nozzle, another group (e.g., a secondary fuel nozzle group) may include two nozzles radially outward of the center nozzle, and a third group (e.g., a tertiary fuel nozzle group) may include three nozzles radially outward of the center fuel nozzle. These groups are provided for illustrative purposes only, and it should be understood that the principles described herein may be applied to combustors having different numbers of fuel nozzles and different groupings of fuel nozzles, including combustors having only a primary fuel nozzle group and a secondary fuel nozzle group.

Figure 5:
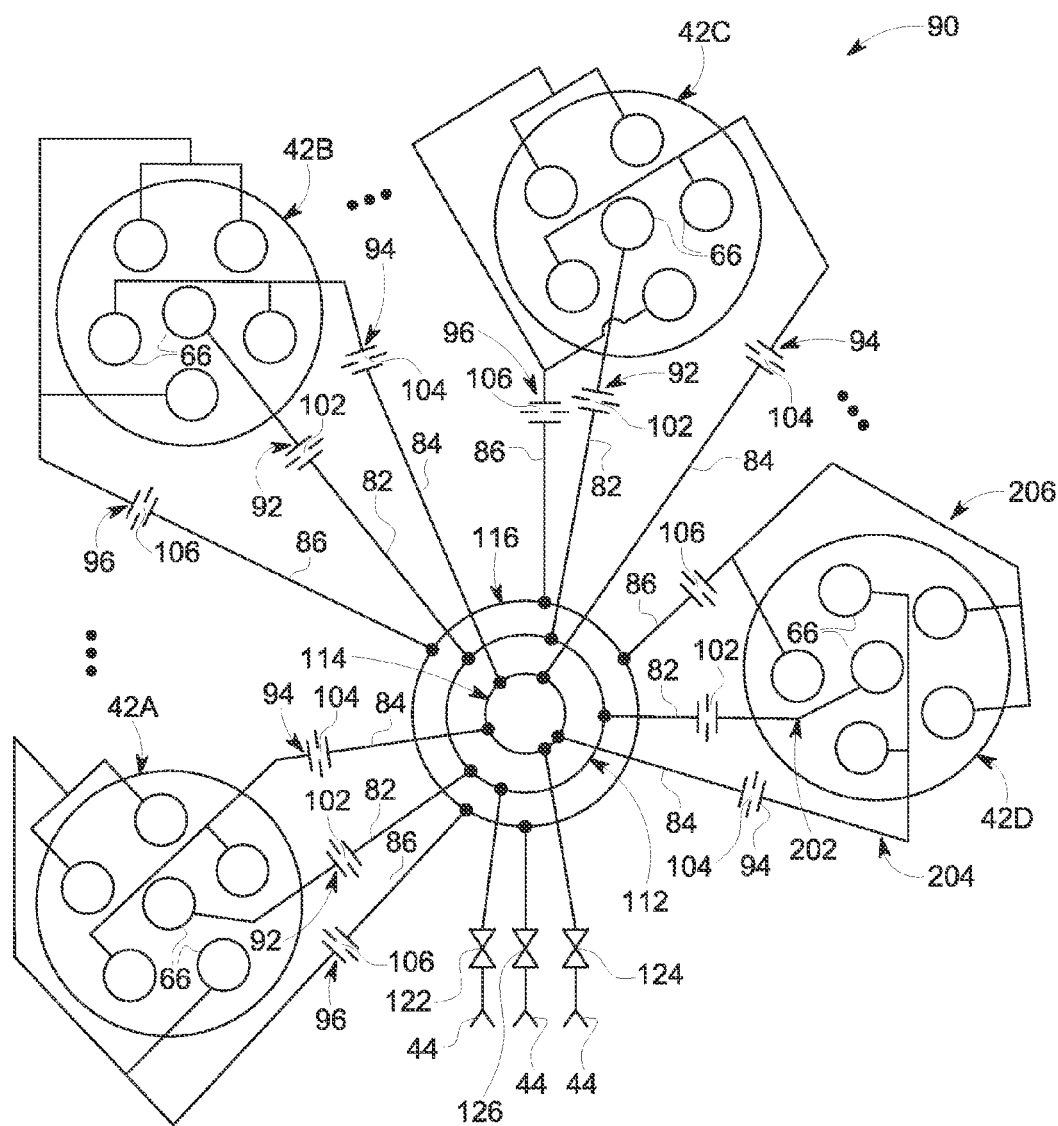
FIG. 5 is a diagram of a system for reducing modal coupling of combustion dynamics, according to an embodiment of the present invention.

Primary, secondary, and tertiary fuel circuits (202, 204, 206) include a gas control valve (122, 124, 126); a fuel manifold (112, 114, 116); a plurality of fuel supply lines (82, 84, 86) directing fuel from a respective fuel manifold to a respective fuel nozzle group; and, optionally, an orifice plate (92, 94, 96) disposed along the fuel supply line between the fuel manifold and the fuel nozzles (as shown in FIG. 5). The fuel flow through each fuel manifold, and ultimately to each group of fuel nozzles, may be controlled by the gas control valve and strategically designed orifice plates. Orifice plates in the respective fuel circuits upstream from the fuel nozzles produce a fuel split between the fuel nozzles in each combustor and/or between different combustors, as will be discussed further herein.

In one embodiment, for example, the orifice plates produce a substantially different fuel split for one or more groups of fuel nozzles in one or more combustors. A change in the fuel nozzle pressure ratio and/or equivalence ratio resulting from differences in the fuel flow rate to a given fuel nozzle or group of fuel nozzles may directly affect the combustion instability frequency and/or amplitude in each combustor. As the frequency of the combustion dynamics in one or more combustors is driven away from that of the other combustors, coherence and, therefore, modal coupling of the combustion dynamics are reduced. As a result, various embodiments of the present invention may reduce the ability of the combustor tone to cause a vibratory response in downstream components.

Although exemplary embodiments of the present invention will be described generally in the context of combustion dynamics in a gas turbine for purposes of illustration, one of ordinary skill in the art will readily appreciate that embodiments of the present invention may be applied to any combustion dynamics and, therefore, the invention is not limited to use within a gas turbine, unless specifically recited in the claims.

Referring now to the drawings, FIG. 1 provides a simplified cross-section view of an exemplary gas turbine 10 that may incorporate various embodiments of the present invention. As shown, the gas turbine 10 may generally include an inlet section 12, a compressor section 14, a combustion section 16, a turbine section 18, and an exhaust section 20. The inlet section 12 may include a series of filters 22 and one or more fluid conditioning devices 24 to clean, heat, cool, moisturize, de-moisturize, and/or otherwise condition a working fluid (e.g., air) 28 entering the gas turbine 10. The cleaned and conditioned working fluid 28 flows to a compressor 30 in the compressor section 14. A compressor casing 32 contains the working fluid 28 as alternating stages of rotating blades 34 and stationary vanes 36 progressively accelerate and redirect the working fluid 28 to produce a continuous flow of compressed working fluid 38 at a higher temperature and pressure.

The majority of the compressed working fluid 38 flows through a compressor discharge plenum 40 to one or more combustors 42 in the combustion section 16. A fuel supply 44 in fluid communication with each combustor 42 supplies a fuel to each combustor 42, via one or more fuel circuits. Possible fuels may include, for example, blast furnace gas, coke oven gas, natural gas, methane, vaporized liquefied natural gas (LNG), hydrogen, syngas, butane, propane, olefins, diesel, petroleum distillates, and combinations thereof. The compressed working fluid 38 mixes with the fuel and ignites to generate combustion gases 46 having a high temperature and pressure.

The combustion gases 46 flow along a hot gas path through a turbine 48 in the turbine section 18 where they expand to produce work. Specifically, the combustion gases 46 may flow across alternating stages of stationary nozzles 50 and rotating buckets 52 in the turbine 48. The stationary nozzles 50 redirect the combustion gases 46 onto the next stage of rotating buckets 52, and the combustion gases 46 expand as they pass over the rotating buckets 52, causing the rotating buckets 52 to rotate. The rotating buckets 52 may connect to a shaft 54 that is coupled to the compressor 30 so that rotation of the shaft 54 drives the compressor 30 to produce the compressed working fluid 46. Alternately or in addition, the shaft 54 may connect to a generator 56 for producing electricity. Exhaust gases 58 from the turbine section 18 flow through the exhaust section 20 prior to release to the environment.

Figure 2:
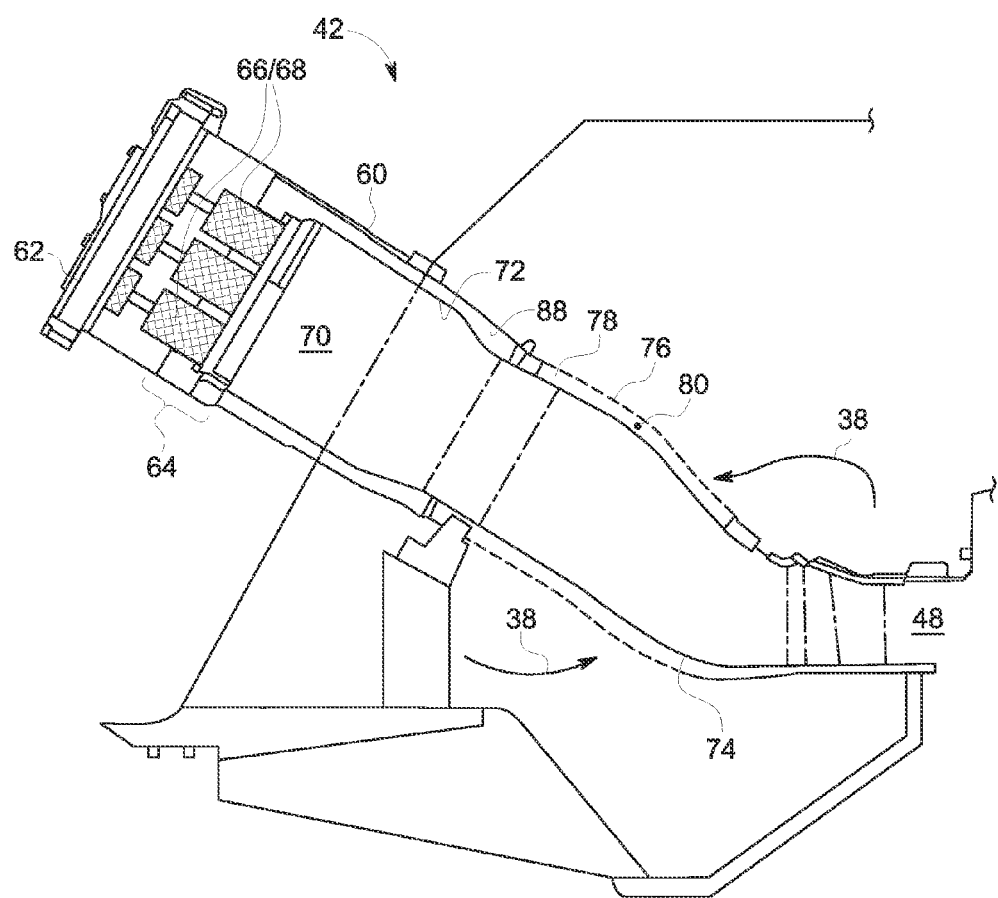
FIG. 2 is a simplified cross-section view of an exemplary combustor, according to various embodiments of the present invention.

The combustors 42 may be any type of combustor known in the art, and the present invention is not limited to any particular combustor design unless specifically recited in the claims. FIG. 2 provides a simplified side cross-section view of an exemplary combustor 42 according to various embodiments of the present invention. As shown in FIG. 2, a combustor casing 60 and an end cover 62 may combine to contain the compressed working fluid 38 flowing to the combustor 42. A cap assembly 64 may extend radially across at least a portion of the combustor 42, and one or more fuel nozzles 66, 68 may be radially arranged across the cap assembly 64 (relative to a longitudinal axis of the combustor 42) to supply fuel to a combustion chamber 70 downstream from the cap assembly 64. A liner 72 circumferentially surrounds at least a portion of the combustion chamber 70, and a transition duct 74 downstream from the liner 72 connects the combustion chamber 70 to the inlet of the turbine 48. Alternately, the liner 72 and the transition duct 74 may be integrated with one another as a single, unitary component.

An impingement sleeve 76 with flow holes 78 may circumferentially surround the transition duct 74, and a flow sleeve 88 may circumferentially surround the liner 72. This arrangement allows the compressed working fluid 38 to pass through the flow holes 78 in the impingement sleeve 76 and to flow through an annular passage 80 radially outward of the transition duct 74 and liner 72. When the compressed working fluid 38 reaches the end cover 62, the compressed working fluid 38 reverses direction to flow through the fuel nozzles 66 and into the combustion chamber 70.

Although generally shown as circular, the cross-section of the fuel nozzles 66 may be any geometric shape, and the present invention is not limited to any particular cross-sectional shape, unless specifically recited in the claims. In addition, various embodiments of the combustor 42 may include different numbers and arrangements of fuel nozzles 66, 68 in the cap assembly 64.

Figure 3:
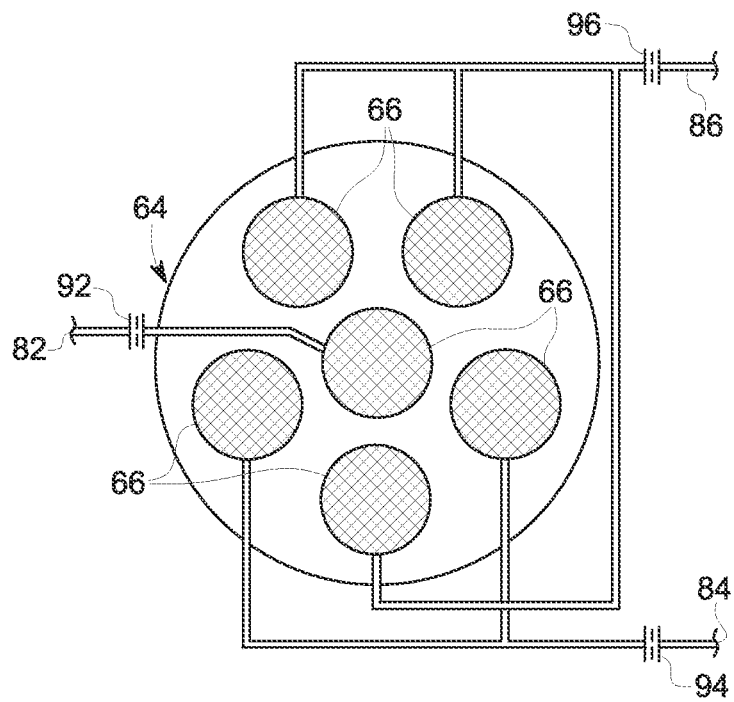
FIG. 3 is an upstream plan view of the cap assembly shown in FIG. 2, according to an embodiment of the present invention.
Figure 4:
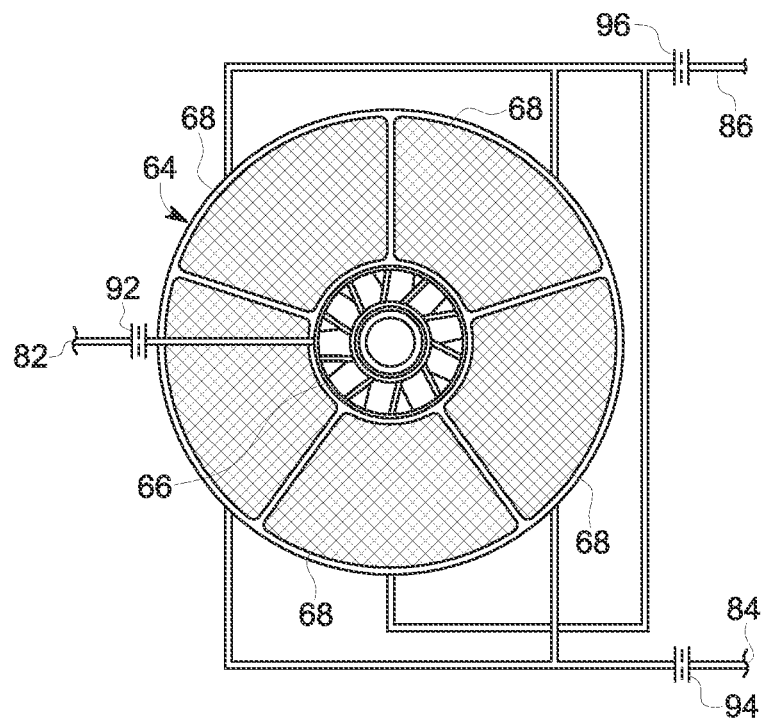
FIG. 4 is an upstream plan view of the cap assembly shown in FIG. 2, according to an alternate embodiment of the present invention.

FIGS. 3 and 4 provide upstream plan views of exemplary arrangements of the fuel nozzles 66, 68 in the cap assembly 64 within the scope of the present invention. As shown in FIG. 3, for example, multiple fuel nozzles 66 may be radially arranged around a single fuel nozzle 66, where all of the fuel nozzles 66 have a circular profile. Alternately, a plurality of non-circular (truncated pie-shaped) fuel nozzles 68 may circumferentially surround a single fuel nozzle 66, as shown in FIG. 4. One of ordinary skill in the art will readily appreciate that multiple other numbers, shapes, and arrangements for the fuel nozzles 66, 68 from the teachings herein may be employed, and, thus, the particular shape and arrangement of the fuel nozzles 66, 68 are not limitations of the present invention, unless specifically recited in the claims.

The fuel nozzles 66, 68 may be divided into various groups or circuits to facilitate multiple fueling regimes over the range of operations. For example, in the exemplary arrangements shown in FIGS. 3 and 4, the center fuel nozzle 66 may define a primary fuel nozzle group and may receive fuel from a first fuel supply line 82, while the surrounding outer fuel nozzles 66, 68, may be grouped as secondary and/or tertiary fuel nozzle groups to receive the same or a different fuel from a respective fuel supply lines 84, 86. FIGS. 3 and 4 illustrate one particular arrangement of fuel nozzles 66, 68, in which a secondary fuel nozzle group of two non-adjacent fuel nozzles 66, 68 is supplied by a second fuel supply line 84 and a tertiary fuel nozzle group of three fuel nozzles 66, 68 is supplied by a third fuel supply line 86. However, other groupings of fuel nozzles 66, 68 may instead be used, including groupings that include the center fuel nozzle 66 and one or more of the surrounding fuel nozzles 66, 68.

During base load operations, all of the fuel lines 82, 84, 86 may be used to supply fuel to the fuel nozzles 66, 68 in the combustors 42 (with respective fuel lines 82, 84, 86 supplying respective primary, secondary, and tertiary groupings of the fuel nozzles 66, 68). Fuel flow may be reduced or completely eliminated from one or more groups of the fuel nozzles 66, 68 during reduced or turndown operations, as dictated by the primary, secondary, and tertiary gas control valves 122, 124, 126 connected to the corresponding primary, secondary, and tertiary fuel manifolds 112, 114, 116. Furthermore, according to one aspect of the present disclosure, the relative fuel flow in each fuel circuit 202, 204, 206 may be varied at a given operating condition, while maintaining constant total fuel flow in each combustor 42, to alter the combustion dynamics amplitudes and/or frequencies and/or to alter the emissions generated by the combustion system.

An overlap between the combustion instability frequency and the downstream component resonant frequency may result in unwanted vibration of the downstream components, particularly when an in-phase and coherent relationship exists between two or more combustors. Various embodiments of the present invention alter the fuel split through the fuel supply lines 82, 84, 86 between at least two combustors 42 to vary the frequencies and/or amplitudes between at least two combustors 42. As a result of this combustor-to-combustor split bias, the embodiments of the present invention may reduce coherence, and therefore modal coupling, of the combustion dynamics between combustors 42.

FIG. 5 provides a diagram of a system 90 for reducing modal coupling of combustion dynamics according to aspects of the present invention, which may be incorporated into the gas turbine 10 previously described with respect to FIG. 1. Although four combustors 42 are shown (individually labeled 42A, 42B, 42C, and 42D), the present invention is not limited to any specific number of combustors 42, unless specifically recited in the claims. Moreover, there is no significance to the labels assigned to each combustor, and no inference about their position or importance should be made based upon any label assigned thereto.

As illustrated in FIG. 5, each combustor 42 includes multiple fuel nozzles 66, and fuel supply lines 82, 84, and/or 86 provide fluid communication between the fuel supply 44 and the fuel nozzles 66. In addition, the fuel nozzles 66 have been arranged into groups or sets. To facilitate discussion and by way of example, the primary fuel nozzle group includes the center fuel nozzle, the secondary fuel nozzle group includes two fuel nozzles radially outward of the center fuel nozzle, and the tertiary fuel nozzle group includes three fuel nozzles radially outward of the center fuel nozzle. For each fuel nozzle group, one of the first, second, and third fuel supply lines 82, 84, 86 extends from one of the respective fuel manifolds 112, 114, 116 (as part of overall fuel circuits 202, 204, 206) and provides fluid communication to the respective groups of nozzles 66.

For instance, the secondary fuel nozzle group in the combustor 42A is in fluid communication with a fuel supply line 84 that extends from the secondary fuel manifold 114 that receives fuel from the secondary gas control valve 124. Another fuel supply line 84 extends between the secondary fuel manifold 114 to the secondary fuel nozzle group in the combustor 42B. Similarly, the primary nozzle groups and the tertiary fuel nozzle groups in each combustor 42 are fueled by respective primary and tertiary fuel manifolds 112, 116.

As further shown in FIGS. 3-5, an orifice plate 92, 94, 96 may be used to limit flow through the respective fuel supply lines 82, 84, 86 to one or more groups of fuel nozzles 66 in one or more combustors 42. As used herein, an "orifice plate" is defined as a plate having one or more holes, or orifices, therethrough, which limit fluid flow through the orifice plate. The holes in each orifice plate 92, 94, 96 collectively define an effective area 102, 104, 106 through the plate that determines the volume and mass flow of fluid (e.g., fuel) through the plate for a given differential pressure across the plate. The effective area 102, 104, 106 of each orifice plate 92, 94, 96 is the combined area through which the fuel can pass and may be calculated as the total cross-sectional area of the holes in the orifice plate 92, 94, 96 multiplied by the coefficient of flow. The coefficient of flow is the ratio of the actual and theoretical maximum flows through the orifice plate 92, 94, 96.

The effective area 102, 104, 106 for each orifice plate 92, 94, 96 may be substantially different for each fuel supply line 82, 84, 86 based on the number of fuel nozzles 66 being fed by each fuel supply line 82, 84, 86, as well as the desired difference, or bias, in the fuel splits from a first combustor (e.g., 42A) to a second combustor (e.g., 42B). Changing the fuel split between the fuel nozzles 66 directly affects the frequency and/or amplitude of the combustion dynamics, and changing the frequency in one or more combustors 42 may reduce coherence and, therefore, modal coupling of combustion dynamics.

In the exemplary embodiment shown in FIG. 5, for example, the effective area 100 of at least one of the primary orifice plates 92 is substantially different from the effective area 102 of at least one of the secondary orifice plates 94, and the effective area 102 is substantially different from the effective area 104 of at least one of the tertiary orifice plates 96. In one embodiment, at least one of the effective areas 102, 104, 106 is substantially different between two or more combustors 42 to produce a difference in combustion dynamics frequencies between two or more combustors 42.

It should be understood that, while reference is made to individual combustors in the describing various embodiments, the principles described herein may equally be applied to combustor groups having two or more combustors.

For example, the primary orifice plate 92 in the fuel supply line 82 supplying a first combustor 42A may define a first effective area 102, while a primary orifice plate 92 in the fuel supply line 82 supplying a second combustor 42B may define a substantially different effective area 102', as compared to the effective area 102 of the orifice plate 92 associated with the first combustor 42A. Optionally, the primary orifice plate 92 in the fuel line 82 supplying a third combustor 42C may define yet another effective area 102", which is substantially different from the effective areas 102 and/or 102'. Additional primary orifice plates 92 having one or more effective areas 102 that are substantially different from other effective areas 102, 102', 102" may also be used for other combustors or combustor groups, if so desired. For the sake of clarity, the prime (') and double prime (") symbols have been omitted from FIG. 5.

Similarly, the secondary orifice plate 94 in the fuel supply line 84 supplying a first combustor 42A may define a second effective area 104, while a secondary orifice plate 94 in the fuel supply line 84 supplying the second combustor 42B may define a substantially different effective area 104', as compared to the effective area 104 of the orifice plate 94 associated with the first combustor 42A. Optionally, the secondary orifice plate 94 in the fuel line 84 supplying a third combustor 42C may define yet another effective area 104", which is substantially different from the effective areas 104 and/or 104'. Additional secondary orifice plates 94 having one or more effective areas 104 that are substantially different from other effective areas 104, 104', 104" may also be used for other combustors or combustor groups, if so desired.

The pattern of substantially different effective areas may be similarly applied to the tertiary orifice plates 96, supplying fuel from the fuel supply lines 86 to yet another group of fuel nozzles 66 in each combustor 42. As described above, different combustors (e.g., 42A, 42B, 42C) are supplied by respective fuel supply lines 86, one or more of which may be provided with its own tertiary orifice plate 96. The tertiary orifice plate 96 supplying fuel to the first combustor 42A may define an effective area 106; the tertiary orifice plate 96 associated with the second combustor 42B may define an effective area 106' substantially different from the effective area 106; and, optionally, the tertiary orifice plate 96 associated with the third combustor 42C may define yet another effective area 106", which is substantially different from the effective areas 106 and/or 106'. Additional third orifice plates 96 having one or more effective areas 106 that are substantially different from other effective areas 106, 106', 106" may also be used for other combustors or combustor groups, if so desired.

As a result, one or more orifice plates 92, 94, 96 varies the fuel splits between two or more combustors 42, which may alter the amplitude and/or frequency of the combustion dynamics between two or more combustors 42 to reduce coherence and modal coupling of combustion dynamics. In many cases, but not all, it would be desirable to maintain a similar total fuel flow to each combustor 42 to maintain a similar temperature of the combustion gases 46 generated by each combustor 42. In such cases, a similar total fuel flow to each combustor may be maintained by ensuring the sum of the effective areas 102, 104, 106 is the same, or approximately the same, for each combustor 42.

It should be understood that, although FIG. 5 shows an orifice plate (92, 94, 96) in connection with every fuel supply line (82, 84, 86) into each combustor 42, such a configuration is not required. In some instances, orifice plates 92 may be installed, in some of the combustors, on the fuel supply lines (82) supplying primary groups of fuel nozzles while orifice plates 94 may be installed, in other of the combustors, on the fuel supply lines (84) supplying secondary groups of fuel nozzles. The primary orifice plates 92 in the fuel supply lines 82 associated with the primary fuel nozzle groups may be identical to one another in terms of effective area 102, but may define an effective area that is substantially different from the effective area 104 defined by the secondary orifice plates 94 in the fuel supply lines 84 associated with the secondary fuel nozzle groups. In this example, the fuel flow to the third group of nozzles in each combustor 42 would be unimpeded by a respective third orifice plate 96.

Alternately, not all of the combustors require an orifice plate. For instance, on some combustors 42 (e.g., 42A, 42B), the orifice plates 94 may be used on the fuel supply lines 84 supplying the secondary group of fuel nozzles 66. On others of the combustors 42 (e.g., 42C, 42D), the orifices plates 96 may be used on the fuel supply lines 86 supplying the tertiary group of fuel nozzles 66. The effective area 104 of the second orifice plates 94 may be substantially different from the effective area 106 of the third orifice plates 96. The combustors 42 having altered fuel flow by the inclusion of orifice plates 94, 96 may or may not be grouped in any particular pattern (e.g., adjacent or alternating).

In some limited circumstances, it may even be possible to achieve the desired frequency variation by installing orifice plates (e.g., 96) having substantially different effective areas 106, 106', etc. on only one of the fuel circuits (e.g., 206), assuming the frequency variation can be achieved with only a small variation in the exhaust temperature from combustor to combustor.

One of ordinary skill in the art will readily appreciate from the teachings herein that the system 90 described and illustrated with respect to FIG. 5 may provide a method for reducing the coherence and the modal coupling of the combustion system. The method may include flowing fuel through orifice plates 92, 94, and/or 96 having substantially the same or substantially different effective areas 102, 104, 106 for one or more sets of fuel nozzles 66 in the combustor 42, and the effective areas 102, 104, and/or 106 may be substantially different between at least two combustors 42, as described with respect to the particular embodiment shown in FIG. 5.

The systems depicted in FIG. 5 may include three or more combustors 42 incorporated into the gas turbine 10 or other turbo-machine. Using the means for producing a combustion dynamics frequency in one combustor 42A that is different from the combustion dynamics frequency in the other combustor 42B, each combustor 42, or group of combustors 42, may be adjusted or tuned to achieve a desired combustion dynamics frequency. A group of combustors may include one or more combustors 42. The combustors 42 in a group need not be arranged in any particular spatial orientation (for instance, adjacent to one another or in an alternating pattern with combustors of another group).

By way of example and not limitation, a first group of the combustors 42 (e.g., 42A, 42C) may be adjusted and/or tuned using orifice plates 92, 94, and/or 96 to achieve a first combustion dynamics frequency, a second group of the combustors 42 (e.g., 42B, 42D) may be adjusted and/or tuned using respective orifice plates 92, 94, and/or 96 to achieve a second combustion dynamics frequency, and a third group of the combustors 42 (not shown) may be adjusted and/or tuned using yet another set of orifice plates 92, 94, and/or 96 to achieve a third combustion dynamics frequency. At least two of the first, second, and third combustion dynamics frequencies are different from one another. As a result, the combustion dynamics frequencies associated with the combustors 42 cannot coherently or constructively interfere with one another, reducing or preventing an increase in the combustion dynamics and/or reducing modal coupling and the ability of the combustion system to drive sympathetic vibrations in the downstream turbine section 18.

The various embodiments described and illustrated with respect to FIGS. 1-5 may provide one or more of the following advantages over existing combustors 42. Specifically, the different effective areas 102, 104, 106 in the orifice plates 92, 94, 96 produce different fuel splits between the fuel nozzles 66 (and/or 68) in two or more combustors 42 to vary the frequencies and to reduce coherence and, therefore, modal coupling between combustors 42. In addition, various embodiments of the present invention may be readily adapted to existing fuel circuits 202, 204, and/or 206 (e.g., as a retrofit addition) to decouple the combustion dynamics, thereby reducing coherence and modal coupling of combustion dynamics. As a result, the various embodiments described herein may enhance thermodynamic efficiency, promote flame stability, and/or reduce undesirable emissions over a wide range of operating levels, without detrimentally impacting the life of the downstream hot gas path components.

This written description uses examples to disclose the invention, including the best mode, and also to enable any person skilled in the art to practice the invention, including making and using any devices or systems and performing any incorporated methods. The patentable scope of the invention is defined by the claims, and may include other variations that occur to those skilled in the art. Such other variations are intended to fall within the scope of the claims if they include structural elements that do not differ from the literal language of the claims, or if they include equivalent structural elements with insubstantial differences from the literal language of the claims.

What is claimed is:

1. A system (90) for reducing modal coupling of combustion dynamics, the system comprising:
   a. a plurality of combustors (42) including a first combustor and a second combustor, wherein each combustor (42) of the plurality of combustors has a primary fuel nozzle group (66; e.g., center fuel nozzle) and a secondary fuel nozzle group (66 or 68; e.g., one or more outer fuel nozzles), and wherein each combustor (42) of the plurality of combustors operates at a combustion frequency;
   b. a primary fuel circuit (202) comprising a primary fuel manifold (112) and a plurality of fuel supply lines (82) extending from the primary fuel manifold (112), a first fuel supply line (82) being in fluid communication with the primary fuel nozzle group (66; e.g., center fuel nozzle) of the first combustor (e.g., 42A) and a second fuel supply line (82) being in fluid communication with the primary fuel nozzle group (66; e.g., center fuel nozzle) of the second combustor (e.g., 42B);
   c. a first orifice plate (92) disposed within the first fuel supply line (82) upstream from the primary fuel nozzle group (66; e.g., center fuel nozzle) of the first combustor (e.g., 42A), the first orifice plate (92) defining a first effective area (102); and d. a second orifice plate (92) disposed within the second fuel supply line (82) upstream from the primary fuel nozzle group (66; e.g., center fuel nozzle) of the second combustor (e.g., 42B), the second orifice plate (92) defining a second effective area (102') substantially different from the first effective area (102);

wherein the difference in the first and second effective areas (102, 102') results in the first combustor (42A) operating at a first combustion frequency and the second combustor (42B) operating at a second combustion frequency different from the first combustion frequency.

2. The system (90) as in claim 1, wherein the plurality of combustors (42) comprises two or more groups of combustors, a first group of combustors (e.g., 42A, 42C) including the first combustor and having primary fuel nozzle groups (66; e.g., center fuel nozzles) associated with the orifice plates (92) having the first effective area (102) and a second group of combustors (e.g., 42B, 42D) including the second combustor and having primary fuel nozzle groups (66; e.g., center fuel nozzles) associated with the orifice plates (92) having the second effective area (102').

3. The system (90) as in claim 2, comprising:
a. a secondary fuel circuit (204) comprising a secondary fuel manifold (114) and a plurality of fuel supply lines (84) extending from the secondary fuel manifold (114), a third fuel supply line (84) being in fluid communication with the secondary fuel nozzle group (66 or 68; e.g., one or more outer nozzles) in the first combustor (e.g., 42A) and a fourth fuel supply line (84) being in fluid communication with the secondary fuel nozzle group (66 or 68; e.g., one or more outer nozzles) in the second combustor (e.g., 42B);
b. a third orifice plate (94) disposed within the third fuel supply line (84) upstream of the secondary fuel nozzle group (66 or 68; e.g., one or more outer nozzles) of the first combustor (42A) and defining a third effective area (104); and
c. a fourth orifice plate (84) disposed within the fourth fuel supply line (84) upstream from the secondary fuel nozzle group (66 or 68; e.g., one or more outer nozzles) of the second combustor (42B) and defining a fourth effective area (104').

4. The system (90) of claim 3, wherein the third effective area (104) of the third orifice plate (94) is substantially different from the fourth effective area (104') of the fourth orifice plate (94).

5. The system (90) as in claim 3, wherein the effective areas (104, 104') of the third and the fourth orifice plates (94) are substantially the same for the first combustor (42A) and the second combustor (42B).

6. The system (90) as in claim 3, wherein the first group of combustors (e.g., 42A, 42C) includes secondary fuel nozzle groups (66 or 68; e.g., one or more outer nozzles) associated with the orifice plates (94) having the third effective area (104) and the second group of combustors (e.g., 42B, 42D) includes secondary fuel nozzle groups (66 or 68; e.g., one or more outer nozzles) associated with the orifice plates (94) having the fourth effective area (104').

7. The system (90) as in claim 3, comprising:
h. a tertiary fuel nozzle group (66 or 68; e.g., one or more outer fuel nozzles not included in secondary fuel nozzle group) in each combustor (42);

i. a tertiary fuel circuit (206) comprising a tertiary fuel manifold (116) and a plurality of fuel supply lines (86) extending from the tertiary fuel manifold (116), a fifth fuel supply line being (86) in fluid communication with the tertiary fuel nozzle group (66 or 68; e.g., one or more outer fuel nozzles not included in the secondary fuel nozzle group) in the first combustor (42A) and a sixth fuel supply line (86) being in fluid communication with the tertiary fuel nozzle group (66 or 68; e.g., one or more outer fuel nozzles not included in the secondary fuel nozzle group) in the second combustor (42B);

j. a fifth orifice plate (96) disposed within the fifth fuel supply line (86) upstream of the tertiary fuel nozzle group of the first combustor (42A) and defining a fifth effective area (106); and k. a sixth orifice plate (96) disposed within the sixth fuel supply line (86) upstream from the tertiary fuel nozzle group of the second combustor (42B) and defining a sixth effective area (106').

8. The system (90) of claim 7, wherein the fifth effective area (106) of the fifth orifice plate (96) is substantially different from the sixth effective area (106') of the sixth orifice plate (96).

9. The system (90) as in claim 7, wherein the effective areas (106, 106') of the fifth and the sixth orifice plates (96) are substantially the same for each of the plurality of combustors (42).

10. The system (90) as in claim 7, wherein the first group of combustors (e.g., 42A, 42C) includes tertiary fuel nozzles (66 or 68; e.g., one or more outer fuel nozzles not included in the secondary nozzle group) associated with the orifice plates (96) having the fifth effective area (106) and the second group of combustors (e.g., 42B, 42D) includes tertiary fuel nozzles (66 or 68; e.g., one or more outer fuel nozzles not included in the secondary nozzle group) associated with the orifice plates (96) having the sixth effective area (106').

11. The system (90) as in claim 7, wherein at least one of the primary fuel nozzle group (66; e.g., center fuel nozzle), the secondary fuel nozzle group (66 or 68; e.g., one or more outer fuel nozzles), and the tertiary fuel nozzle group (66 or 68; e.g., one or more outer fuel nozzles not included in the secondary fuel nozzle group) comprises a plurality of fuel nozzles.

12. The system (90) as in claim 10, wherein a sum of the first, third, and fifth effective areas (102, 104, 106) is at least approximately the same as a sum of the second, fourth, and sixth effective areas (102', 104', 106') for each of the combustors (42) in the first group of combustors (e.g., 42A, 42C) and the second group of combustors (e.g., 42B, 42D).

13. A gas turbine (10) comprising:
a. a compressor section (14) configured to produce a working fluid (28);
b. a plurality of combustors (42) downstream of the compressor section (14), the plurality of combustors including a first combustor and a second combustor, wherein each combustor (42) of the plurality of combustors has a primary fuel nozzle group (66; e.g., center fuel nozzle) and a secondary fuel nozzle group (66 or 68; one or more outer fuel nozzles), and wherein each combustor (42) of the plurality of combustors operates at a combustion frequency;
c. a turbine section (18) downstream from the plurality of combustors (42);
d. a primary fuel circuit (202) comprising a primary fuel manifold (112) and a plurality of fuel supply lines (82) extending from the primary fuel manifold (112), a first fuel supply line (82) being in fluid communication with the primary fuel nozzle group (66; e.g., center fuel nozzle) of the first combustor (42A) and a second fuel supply line (82') being in fluid communication with the primary fuel nozzle group (66; e.g., center fuel nozzle) of the second combustor (42B);

e. a first orifice plate (92) disposed within the first fuel supply line (82) upstream from the primary fuel nozzle group (66; e.g., center fuel nozzle) of the first combustor (42A), the first orifice plate (92) defining a first effective area (102); and f. a second orifice plate (92') disposed within the second fuel supply line (82') upstream from the primary fuel nozzle group (66; e.g., center fuel nozzle) of the second combustor (42B), the second orifice plate (92') defining a second effective area (102') substantially different from the first effective area (102);

wherein the difference in the first and second effective areas (102, 102') results in the first combustor (42A) operating at a first combustion frequency and the second combustor (42B) operating at a second combustion frequency different from the first combustion frequency.

14. The gas turbine (10) as in claim 13, further comprising:

g. a secondary fuel circuit (204) comprising a secondary fuel manifold (114) and a plurality of fuel supply lines (84) extending from the secondary fuel manifold (114), a third fuel supply line (84) being in fluid communication with the secondary fuel nozzle group (66 or 68; e.g., one or more outer fuel nozzles) in the first combustor (42A) and a fourth fuel supply line (84') being in fluid communication with the secondary fuel nozzle group (66 or 68; e.g., one or more outer fuel nozzles) in the second combustor (42B);

h. a third orifice plate (94) disposed within the third fuel supply line (84) upstream of the secondary fuel nozzle group (66 or 68; one or more outer fuel nozzles) of the first combustor (42A) and defining a third effective area (104); and i. a fourth orifice plate (94') disposed within the fourth fuel supply line (84') upstream from the secondary fuel nozzle group (66 or 68; one or more outer fuel nozzles) of the second combustor (42B) and defining a fourth effective area (104').

15. The gas turbine (10) as in claim 14, wherein the plurality of combustors (42) comprises two or more groups of combustors, a first group of combustors (e.g., 42A, 42C) including the first combustor and having primary fuel nozzle groups (66; e.g., center fuel nozzles) associated with the orifice plates (92) having the first effective area (102) and having secondary fuel nozzle groups (66 or 68; one or more outer fuel nozzles) associated with the orifice plates (94) having the third effective area (104); and a second group of combustors (e.g., 42B, 42D) including the second combustor and having primary fuel nozzle groups (66; e.g., center fuel nozzles) associated with the orifice plates (92') having the second effective area (102') and having secondary fuel nozzle groups (66 or 68; e.g., one or more outer fuel nozzles) associated with the orifice plates (94') having the fourth effective area (104').

16. The gas turbine (10) as in claim 15, wherein a sum of the first and third effective areas (102, 104) is at least approximately the same as a sum of the second and fourth effective areas (102', 104') for each of the combustors (42) in the first group of combustors (e.g., 42A, 42C) and the second group of combustors (e.g., 42B, 42D).

* * * * *